(12) United States Patent
Lee et al.

(10) Patent No.: US 10,458,300 B2
(45) Date of Patent: Oct. 29, 2019

(54) ENGINE EXHAUST CATALYST HEATING SYSTEM

(71) Applicant: Hyundai Motor Company, Seoul (KR)

(72) Inventors: Hyungbok Lee, Seongnam-si (KR); Jong Il Park, Seoul (KR); Kwanhee Choi, Seoul (KR); Joowon Lee, Gwangju-si (KR); Dong Hee Han, Seoul (KR); Hyun Jun Lim, Incheon (KR)

(73) Assignee: Hyundai Motor Company, Seoul (KR)

( * ) Notice: Subject to any disclaimer, the term of this patent is extended or adjusted under 35 U.S.C. 154(b) by 378 days.

(21) Appl. No.: 15/359,386

(22) Filed: Nov. 22, 2016

(65) Prior Publication Data

US 2018/0058289 A1    Mar. 1, 2018

(30) Foreign Application Priority Data

Aug. 30, 2016 (KR) ........................ 10-2016-0110844

(51) Int. Cl.
  *F01N 3/20* (2006.01)
  *B01D 53/94* (2006.01)
  (Continued)

(52) U.S. Cl.
  CPC ....... *F01N 3/2006* (2013.01); *B01D 53/9495* (2013.01); *F01N 3/10* (2013.01); *F01N 3/22* (2013.01); *F01N 3/225* (2013.01); *F01N 13/107* (2013.01); *F02B 37/04* (2013.01); *F02B 37/168* (2013.01); *F02B 39/10* (2013.01); *F02B 75/20* (2013.01); *F02D 41/0007* (2013.01);
  (Continued)

(58) Field of Classification Search
  CPC ...... F01N 3/2006; F01N 2430/02; F01N 3/22; F01N 3/323; F01N 2430/08; F02D 41/0087; B01D 53/9495; F02B 33/44; F02B 39/10; F02B 37/013
  USPC .................................. 60/289, 612, 280, 608
  See application file for complete search history.

(56) References Cited

U.S. PATENT DOCUMENTS 6,751,949 B2 *   6/2004  Tamura ................. F01N 3/2006
                                                               60/284
2013/0333360 A1 * 12/2013 Han ........................ F02B 29/04
                                                               60/289

FOREIGN PATENT DOCUMENTS

JP    2007-332925 A    12/2007
JP    2011-241731 A    12/2011

* cited by examiner

*Primary Examiner* — Phutthiwat Wongwian
*Assistant Examiner* — Edward Bushard
(74) *Attorney, Agent, or Firm* — Morgan, Lewis & Bockius LLP

(57) ABSTRACT

An engine system may include an intake line, and a cylinder deactivation (CDA) device selectively deactivating a portion of combustion chambers in the engine. The engine system may further include a first exhaust manifold connected to a first plurality of combustion chambers mounted with the CDA device, a second exhaust manifold connected to a second plurality of combustion chambers without the CDA device, a first exhaust line connected to the first exhaust manifold, a second exhaust line connected to the second exhaust manifold, and a third exhaust line connected with the first and second exhaust lines through an exhaust gas processing device. In addition, a turbocharger including a turbine is mounted at the first exhaust line and rotated by exhaust gas. An air injection device may supply air to the second exhaust manifold or the second exhaust line in a catalyst heating mode of the exhaust gas processing device.

6 Claims, 4 Drawing Sheets

(51) Int. Cl.
   *F01N 13/10*   (2010.01)
   *F02B 37/04*   (2006.01)
   *F02B 37/16*   (2006.01)
   *F02B 75/20*   (2006.01)
   *F02D 41/00*   (2006.01)
   *F02D 41/02*   (2006.01)
   *F01N 3/10*    (2006.01)
   *F01N 3/22*    (2006.01)
   *F02B 39/10*   (2006.01)
   *F02B 75/18*   (2006.01)

(52) U.S. Cl.
   CPC ....... F02D 41/0087 (2013.01); F02D 41/025 (2013.01); *B01D 53/9454* (2013.01); *F01N 2240/04* (2013.01); *F01N 2270/04* (2013.01); *F01N 2290/06* (2013.01); *F01N 2430/04* (2013.01); *F01N 2550/14* (2013.01); *F01N 2900/1602* (2013.01); *F01N 2900/1631* (2013.01); *F02B 2075/1816* (2013.01); *F02D 41/0255* (2013.01); *F02D 2200/0802* (2013.01); *Y02T 10/144* (2013.01); *Y02T 10/26* (2013.01)

ENGINE EXHAUST CATALYST HEATING SYSTEM

CROSS-REFERENCE TO RELATED APPLICATION

The present application claims priority to and the benefit of Korean Patent Application No. 10-2016-0110844 filed on Aug. 30, 2016, the entire contents of which are incorporated herein by reference.

BACKGROUND OF THE INVENTION

Field of the Invention

The present invention relates to an engine system. More particularly, the present invention relates to an engine system including a turbocharger and an electric supercharger, deactivating a portion of combustion chambers of a cylinder deactivation (CDA) device depending a driving region of a vehicle, and quickly increasing a temperature of a catalyst in a catalyst heating mode.

Description of Related Art

An engine of a vehicle combusts a mixture of air inflowing from the outside and a fuel with an appropriate ratio to generate power.

In a process of generating the power by a driving the engine, the external air for the combustion must be appropriately supplied to obtain a desired output and combustion efficiency. For this, a turbocharger as a device for turbocharging the air for the combustion to increase the combustion efficiency of the engine is used.

In general, a turbocharger is a device that rotates a turbine by using pressure of exhaust gas discharged from an engine and thereby increases output of the engine by supplying high-pressure air to a combustion chamber by using rotational force thereof. The turbocharger is applied to most diesel engines and has also been recently applied to gasoline engines.

The turbocharger includes a wastegate valve controlling an amount of exhaust gas that is exhausted from the combustion chamber to be supplied to the turbine. A cost of the wastegate valve used in the turbocharger is very high.

As another example of an intake boost device, an electric supercharger using a motor to drive a compressor to compress external air has been used. Since the electric supercharger is driven by a battery, there is little boost, and it mainly supplies supercharged air to the combustion chamber in a low speed and low load region.

In general, the turbocharger (hereinafter referred to as 'a mechanical turbocharger') operated by the exhaust gas has low responsiveness, and it is difficult to realize a high compression ratio because of a magnitude of a back pressure.

In general, in the electric supercharger used in the vehicle, since an output of the motor is limited, a boosting region is limited to a low and middle speed region.

Accordingly, development of an engine system of a new concept including both the mechanical turbocharger and the electric supercharger is required.

Also, recently, environmental regulations on noxious materials in exhaust gases from vehicles have been increasingly enhanced in many countries. Accordingly, vehicles are equipped with various types of catalyst devices for removing noxious materials such as NOx, CO, and THC contained in exhaust gases under those regulations on exhaust gases.

As an example of the catalyst devices, a diesel oxidation catalyst (DOC), a diesel particulate filter (DPF), a nitrogen oxide cleaning unit (LNT, lean NOx trap), a selective catalytic reduction (SCR) unit, and the like have been used.

A post-processing system such as the DOC, the LNT, and the SCR mounted for the purpose of reducing exhaust gas requires a basic temperature for chemical reaction.

In general, in a cool engine state, the exhaust gas temperature is low and the post-processing device is not activated in this region, so a purification ratio of the exhaust gas by the post-processing device is low such that there is a problem that an exhaust amount of the exhaust gas such as nitrogen oxide (NOx) increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system of a new concept including the mechanical turbocharger operated by the exhaust gas and the electric turbocharger operated by the motor.

Further, various aspects of the present invention are directed to providing the engine system reducing the back pressure and realizing the high compression ratio by deactivating a portion of combustion chambers through a cylinder deactivation (CDA) device in the low speed region and by bypassing the exhaust gas exhausted from the activated combustion chambers from the turbocharger.

Also, various aspects of the present invention are directed to providing an engine system reducing an unnecessary pumping loss and improving fuel consumption by deactivating the portion of combustion chambers in the low speed region.

In addition, various aspects of the present invention are directed to providing an engine system that quickly increases the temperature of a catalyst in a catalyst heating mode of the exhaust gas purification device.

An engine system according to an exemplary embodiment of the present invention includes: an engine including a plurality of combustion chambers generating a driving torque by combustion of a fuel; an intake line flowing fresh air for supplying fresh air to the combustion chambers; a cylinder deactivation (CDA) device mounted at a portion of combustion chambers among the plurality of combustion chambers and selectively deactivating the portion of combustion chambers; a first exhaust manifold connected to combustion chambers mounted with the CDA device; a second exhaust manifold connected to s combustion chambers without the CDA device; a first exhaust line flowing exhaust gas exhausted from the first exhaust manifold; a second exhaust line flowing exhaust gas exhausted from the second exhaust manifold; a main exhaust line to which the first exhaust line and the second exhaust line are joined; an exhaust gas processing device at which the main exhaust line is mounted; a turbocharger including a turbine mounted at the first exhaust line and rotated by the exhaust gas and a compressor rotated in connection with the turbine for compressing external air; an electric supercharger including a motor mounted at the intake line to supply supercharged air to the combustion chamber and an electric compressor operated by the motor; and an air injection device supplying the fresh air to the second exhaust manifold or the second exhaust line in a catalyst heating mode of the exhaust gas processing device.

The air injection device may include: an air line branched from the intake line and joined to the second exhaust manifold or the second exhaust line; and an air control valve mounted at the air line and controlling an air amount supplied to the second exhaust manifold or the second exhaust line.

The intake line may include a bypass line bypassing a part of the air supplied to the electric supercharger, a bypass valve may be mounted at the bypass line, and the air line may be branched from a downstream side of the bypass valve.

In the catalyst heating mode of the exhaust gas processing device, the combustion chamber may be deactivated and the bypass valve is blocked by the operation of the CDA device, the fresh air flowing in the intake line may be compressed by the operation of the electric supercharger, and the air control valve is configured to be opened such that a part of the fresh air flowing in the intake line may be supplied to the second exhaust manifold or the second exhaust line.

The catalyst heating mode may be turned ON when a catalyst temperature of the exhaust gas processing device is less than a predetermined temperature.

The combustion chambers may be included in a four-cylinder engine sequentially including four combustion chambers of a first combustion chamber, a second combustion chamber, a third combustion chamber, and a fourth combustion chamber, and the CDA device may be mounted at the second combustion chamber and the third combustion chamber.

According to the engine system according to an exemplary embodiment of the present invention, the exhaust gas exhausted from the portion of combustion chambers operates the turbocharger, and the exhaust gas exhausted from the rest of the combustion chambers is directly exhausted to the exhaust gas processing device such that the back pressure may be reduced and the high compression ratio engine may be realized.

Further, the exhaust gas exhausted from the portion of combustion chambers operates the turbocharger, and the exhaust gas exhausted from the rest of the combustion chambers is directly exhausted to the exhaust gas processing device such that a wastegate of a high cost may be omitted.

Also, in the low speed region, the portion of combustion chambers are deactivated through the CDA device and the air supplied to the rest of the combustion chambers is supercharged through the electric supercharger such that responsiveness may be realized in the low speed region.

Further, in the catalyst heating mode of the exhaust gas purification device, as the fresh air is supplied to the exhaust system connected to the combustion chambers without the CDA device, the temperature of the catalyst of the exhaust gas purification device may be quickly increased, thereby improving an exhaust gas purification ratio.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
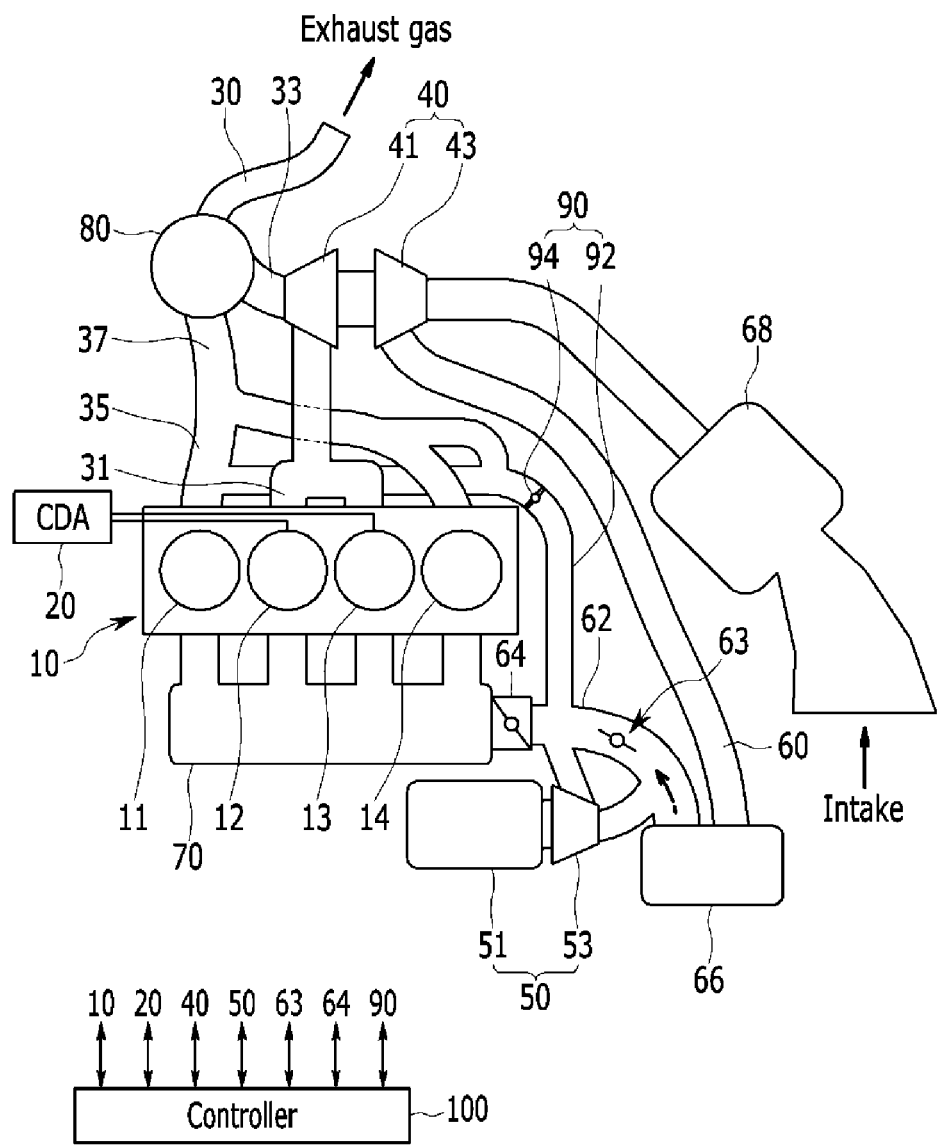
FIG. 1 is a schematic view showing a configuration of an engine system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The parts not related to the description of the exemplary embodiments are not shown to make the description clear, and like reference numerals designate like elements throughout the specification.

The sizes and thicknesses of the configurations shown in the drawings are selectively provided for convenience of description, such that the present invention is not limited to those shown in the drawings, and the thicknesses are exaggerated to make some parts and regions clear.

Now, the engine system according to an exemplary embodiment of the present invention will be described with reference to accompanying drawings.

FIG. 1 is a schematic view showing a configuration of an engine system according to an exemplary embodiment of the present invention.

As shown in FIG. 1, an engine system according to an exemplary embodiment of the present invention includes an engine 10 including a plurality of combustion chambers generating a driving torque by combustion of a fuel, an intake line 60 flowing fresh air to supply the fresh air to the combustion chamber, a turbocharger 40 supplying turbocharged air to the combustion chamber, a cylinder deactivation (CDA) device 20 deactivating a portion of the combustion chambers, an electric supercharger 50 supplying supercharged air to the combustion chamber and operated by a motor 51, an exhaust manifold and an exhaust line flowing an exhaust gas exhausted from the combustion chamber, and an air injection device 90 supplying the fresh air to the exhaust manifold or the exhaust line.

The combustion chamber of the engine 10 may be a four-cylinder engine having four combustion chambers. In a plurality of combustion chambers, a first combustion chamber 11, a second combustion chamber 12, a third combustion chamber 13, and a fourth combustion chamber 14 may be sequentially disposed.

The cylinder deactivation (CDA) device 20 is a device mounted at the portion of combustion chambers among the entire combustion chambers and selectively deactivating the portion of combustion chambers. While the CDA device 20 is operating, the fuel is not supplied to the combustion chambers that are a deactivation targets, and the operation of the intake valve and the exhaust valve is stopped. The CDA device 20 is disclosed in a technical field including the present invention such that a description thereof is omitted.

The CDA device 20 is mounted to the second combustion chamber 12 and the third combustion chamber 13 among the four combustion chambers.

The exhaust manifold includes a first exhaust manifold 31 connected to the combustion chambers mounted with the CDA device 20, and a second exhaust manifold 35 connected to the combustion chambers to which the CDA device 20 is not mounted.

The first exhaust manifold 31 is connected to a first exhaust line 33, and the second exhaust manifold 35 is connected to a second exhaust line 37. The first exhaust line 33 and the second exhaust line 37 are joined to a main exhaust line 30. An exhaust gas processing device 80 purifying the exhaust gas is mounted at the main exhaust line 30 joined with the first exhaust line 33 and the second exhaust line 37.

The exhaust gas processing device 80 includes an SCR catalyst to purify noxious materials including hydrocarbons (HC), carbon monoxide (CO), and nitrogen oxides (NOx) from exhaust gas generated from the combustion chamber of the engine. The SCR catalyst induces an oxidation reaction of hydrocarbons and carbon monoxide and a reduction reaction of nitrogen oxides by impregnating precious metals including platinum, palladium, and rhodium with aluminum as a base.

The catalyst has a purifying ability that increases as the temperature increases. When the catalyst does not reach an activation temperature, the ability to purify noxious materials is reduced, so it cannot oxidize or reduce noxious materials and allows these materials to be discharged to the atmosphere, and accordingly, emissions may be deteriorated. The temperature of the SCR catalyst is detected through a temperature sensor.

The turbocharger 40 to supply the turbocharged air to the combustion chamber includes a turbine 41 rotated by the exhaust gas exhausted from the combustion chamber and a compressor 43 rotated in connection with the turbine 41 to compress the external air. In the instant case, the turbine 41 is connected to the first exhaust line 33 and is configured to be operated by the exhaust gas exhausted through the first exhaust manifold 31.

The electric supercharger 50 to supply supercharged air to the combustion chamber includes the motor 51 and an electric compressor 53. The electric compressor 53 is configured to be operated by the motor 51 and compresses external air depending on a driving condition to be supplied to the combustion chamber.

The compressor 43 of the turbocharger 40 and the electric supercharger 50 are provided to the intake line 60 inflowing the external air. An air cleaner 68 for filtering the inflowing external air is mounted at an entrance of the intake line 60. An intercooler 66 for cooling the external air inflowing from an outside is mounted at the intake line 60.

That is, the compressor 43 of the turbocharger 40 is positioned at an upstream side of the intake line 60, and the electric supercharger 50 is positioned at a downstream side of the intake line 60. The air in flowing through the intake line 60 is supplied to the combustion chamber through an intake manifold 70. An air amount supplied to the combustion chamber is controlled by a throttle valve 64 mounted at the entrance of the intake manifold 70.

A bypass line 62 bypassing a portion of air supplied to the electric supercharger 50 is mounted at the intake line 60. A bypass valve 63 is mounted on the bypass line 62. An amount of supercharging of the electric supercharger 50 is controlled by the bypass valve 63.

The air injection device 90 supplies a part of the fresh air flowing in the intake line 60 to the exhaust system, and in detail, to the second exhaust manifold 35 or the second exhaust line 37.

The air injection device 90 includes an air line 92 branched from the intake line and joined to the second exhaust manifold or the second exhaust line, and an air control valve 94 mounted at the air line 92 and controlling an amount of air supplied to the second exhaust manifold 35 or the second exhaust line 37.

In detail, the air line 92 is branched from a lower stream of the bypass valve 63 and is joined to the second exhaust manifold or the second exhaust line.

The engine system according to an exemplary embodiment of the present invention includes a controller 100 controlling the operations of the engine 10, the CDA device 20, the turbocharger 40, the electric supercharger 50, the throttle valve 64, and the air injection device 90.

The controller 100 may be provided with at least one processor operated with a predetermined program, and the predetermined program performs each step of a control method of the engine system according to an exemplary embodiment of the present invention.

Meanwhile, the engine system according to an exemplary embodiment of the present invention may further include a low pressure EGR device.

Figure 2:
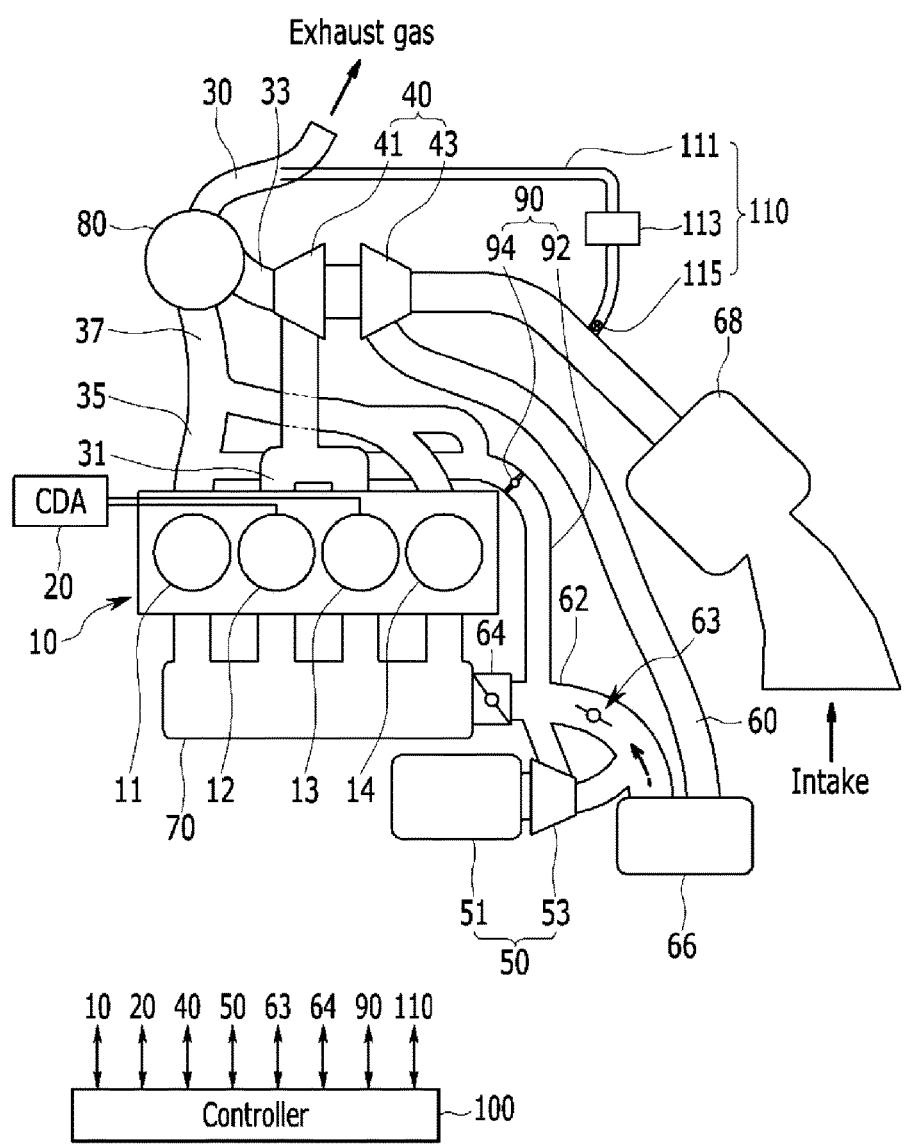
FIG. 2 is a schematic view showing a configuration of an engine system including a low pressure EGR device according to an exemplary embodiment of the present invention.

FIG. 2 is a schematic view showing a configuration of an engine system including a low pressure EGR device according to an exemplary embodiment of the present invention.

As shown in FIG. 2, the low pressure EGR device 110 includes a low pressure EGR line 111, a low pressure EGR cooler 113, and a low pressure EGR valve 115.

The low pressure EGR line 111 is branched from the main exhaust line 30 of the rear end of the catalyst and is joined to the intake line 60 of the front end of the compressor 43. The low pressure EGR cooler 113 cools the exhaust gas flowing in the low pressure EGR line 111. The low pressure EGR valve 115 is installed at a position where the low pressure EGR line 111 and the intake line 60 are joined, and controls the exhaust gas amount recirculated through the low pressure EGR line 111.

The engine system according to an exemplary embodiment of the present invention may further include a high pressure EGR device.

Figure 3:
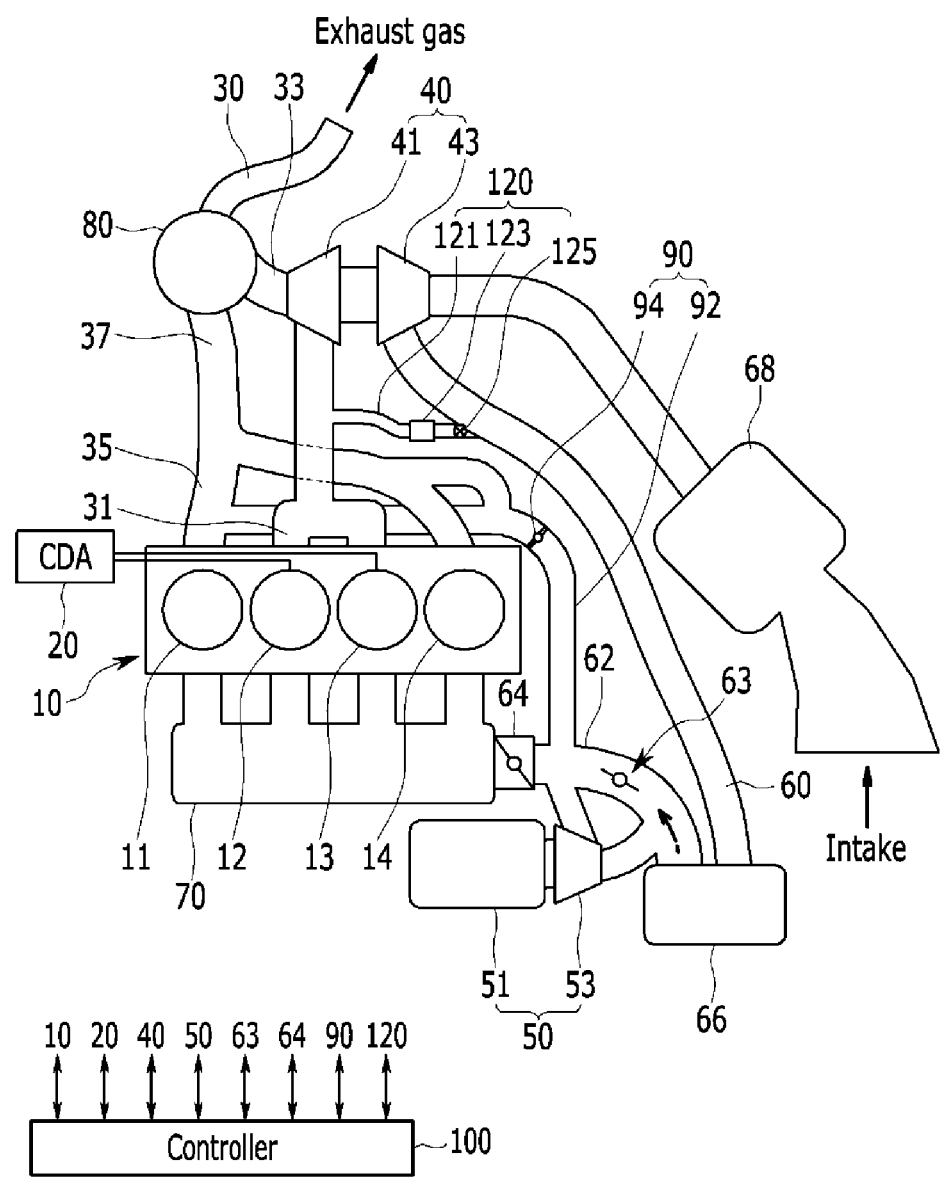
FIG. 3 is a schematic view showing a configuration of an engine system including a high pressure EGR device according to an exemplary embodiment of the present invention.

FIG. 3 is a schematic view showing a configuration of an engine system including a high pressure EGR device according to an exemplary embodiment of the present invention.

As shown in FIG. 3, the high pressure EGR device 120 includes a high pressure EGR line 121, a high pressure EGR cooler 123, and a high pressure EGR valve 125.

The high pressure EGR line 121 is branched from the first exhaust line 33 of the front end of the turbine 41 and is joined to the intake line 60 of the rear end of the compressor 43. The high pressure EGR cooler 123 cools the exhaust gas flowing in the high pressure EGR line 121. The high pressure EGR valve 125 is installed at the position where the high pressure EGR line 121 and the intake line 60 are joined, and controls the exhaust gas amount recirculated through the high pressure EGR line 121.

Hereinafter, the operation of the engine system according to an exemplary embodiment of the present invention will be described with reference to accompanying drawings.

Figure 4:
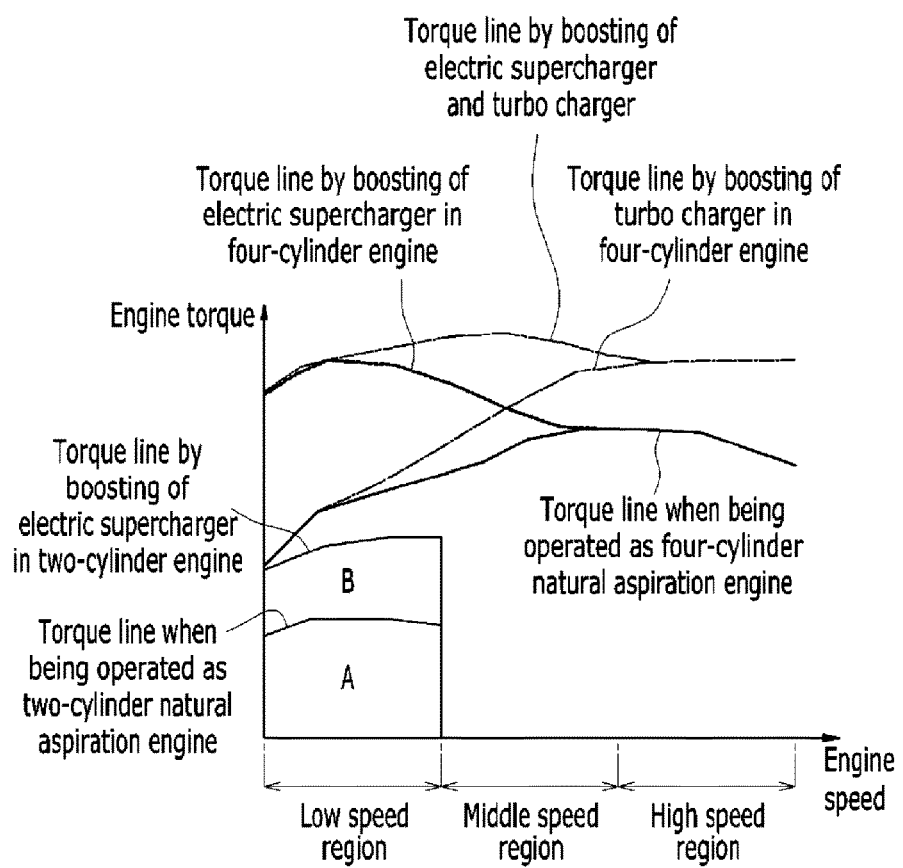
FIG. 4 is a graph showing a driving region according to an exemplary embodiment of the present invention.

FIG. 4 is a graph showing a driving region according to an exemplary embodiment of the present invention. In FIG. 4, a horizontal axis represents an engine rotation speed, and a vertical axis represents an engine torque.

In FIG. 4, a solid line is a torque line when the engine is configured to be operated as a naturally aspirated engine, a dotted line is a torque line found through boosting of the electric supercharger 50, a one-point chain line is a torque line found through boosting of the turbocharger 40, and a two-point chain line is a torque line found through boosting of the electric supercharger 50 and the turbocharger 40.

Referring to FIG. 4, in the low speed region when the rotation speed of the engine is relatively small, the CDA device 20 is configured to be operated such that the second combustion chamber 12 and the third combustion chamber 13 are deactivated. Since the second combustion chamber 12 and the third combustion chamber 13 are deactivated, the exhaust gas is not exhausted through the first exhaust manifold 31 connected to the second combustion chamber 12 and the third combustion chamber 13, the turbocharger 40 is not operated.

Also, the first combustion chamber 11 and the fourth combustion chamber 14 exhaust to the main exhaust line 30 through the second exhaust manifold 35 and the second exhaust line 37 without passing through the turbocharger 40, a back pressure may be reduced. Accordingly, the compression ratio of the first combustion chamber 11 and the fourth combustion chamber 14 may increase such that the fuel consumption may be improved.

Since the supercharged air is supplied to the first combustion chamber 11 and the fourth combustion chamber 14 through the electric supercharger 50, it may be confirmed that the driving region, through the boosting of the electric supercharger 50 (referring to 'B' of FIG. 4), is expanded more than the driving region (referring to 'A' of FIG. 4) when the two-cylinder engine is configured to be operated as the naturally aspirated engine in the low speed region.

That is, the region 'A' of FIG. 4 is a region where the engine is configured to be operated as the naturally aspirated engine, and in the instant case, the engine torque may be controlled through the opening of the throttle valve. The region 'B' of FIG. 4 is a region where the engine torque is controlled through the boosting of the electric supercharger.

Further, in the low speed high load region, the CDA device 20 is not operated such that the engine is configured to be operated as the four-cylinder engine. In the instant case, the supercharged air is supplied to the combustion chamber through the electric supercharger 50 such that the driving region in the low speed region may be expanded. The engine is configured to be operated as the four-cylinder engine such that the turbocharger 40 is also operated, however the exhaust gas amount exhausted from the first combustion chamber 11 and the fourth combustion chamber 14 is not large in the low speed region such that the boosting by the turbocharger 40 is limited.

In a middle speed region in which the rotation speed of the engine is higher than in the low speed region, the CDA is not operated and the engine 10 is configured to be operated as the four-cylinder engine.

Accordingly, the turbocharger 40 is configured to be operated by the exhaust gas exhausted from the first combustion chamber 11 and the fourth combustion chamber 14, and the turbocharged air is supplied to the combustion chamber by the turbocharger 40. Also, the supercharged air is supplied to the combustion chamber by the electric supercharger 50.

That is, the boosting is realized by the turbocharger 40 and the electric supercharger 50 in the middle speed region.

In a high speed region when the rotation speed of the engine rotation speed is higher than in the middle speed region, the CDA is not operated and the engine 10 is operated as the four-cylinder engine.

Accordingly, the turbocharger 40 is configured to be operated by the exhaust gas exhausted from the first combustion chamber 11 and the fourth combustion chamber 14 and the turbocharged air is supplied to the combustion chamber by the turbocharger 40.

That is, in the high speed region, the boosting is realized by the turbocharger 40.

In a case of a conventional turbocharger 40, a flow amount of the exhaust gas is increased in the high speed region such that the turbine 41 is rotated faster than a rotation allowable limit such that an overload problem of the turbine 41 is generated. To solve this problem, a wastegate valve is used to bypass a part of the exhaust gas exhausted from the combustion chamber of the engine 10. In this case, about half of the exhaust gas exhausted from the combustion chamber of the engine 10 bypasses the turbine 41.

However, in the engine system according to an exemplary embodiment of the present invention, two combustion chambers (the second combustion chamber 12 and the third combustion chamber 13) are connected to the turbine 41 of the turbocharger 40 such that it is not necessary to bypass the exhaust gas supplied to the turbine 41 of the turbocharger 40 in the high speed region. Accordingly, the wastegate valve used in the conventional turbocharger 40 may be omitted, thereby reducing the manufacturing cost of the vehicle.

Hereinafter, the operation of the air injection device 90 will be described.

The controller 100 operates the CDA device in a catalyst heating mode of the exhaust gas processing device 80 such that the second combustion chamber 12 and the third combustion chamber 13 are deactivated. The controller 100 blocks the bypass valve 63 and operates the electric supercharger 50 to increase the pressure of the intake line 60 between the bypass valve 63 and the throttle valve 64.

When the controller 100 opens the air control valve 94, a part of the fresh air compressed at the intake line 60 is supplied to the second exhaust manifold 35 or the second exhaust line 37.

The fresh air supplied to the second exhaust manifold 35 or the second exhaust line 37 is mixed with the exhaust gas exhausted from the first combustion chamber 11 and the fourth combustion chamber 14, so oxidation heat is generated while a remaining fuel included in the exhaust gas is oxidized such that the oxidization heat heats the catalyst. Accordingly, the temperature of the catalyst may be quickly increased by the oxidization heat in the catalyst heating mode, thereby exhaust gas purification is improved and emissions are improved.

Since the air of the intake line 60 is compressed by the electric supercharger 50, the pressure of the front end of the air control valve 94 is higher than the pressure of the rear end, and the turbocharger 40 is not connected to the second exhaust manifold 35 or the second exhaust line 37 such that the back pressure is small. Accordingly, when an additional part including a pump is omitted, the fresh air may smoothly flow from the front end to the rear end of the air control valve 94.

Here, the catalyst heating mode may be a case that the catalyst temperature of the exhaust gas processing device 80 is lower than a predetermined temperature. The catalyst heating mode may be case when the engine cool-starts or the engine is started while the vehicle is coasting.

The above-described engine system according to an exemplary embodiment of the present invention is operated as the two-cylinder engine or the four-cylinder engine through the CDA device 20. Accordingly, the engine system in the low speed region is operated as the two-cylinder engine and an unnecessary pumping loss is reduced, thereby improving the fuel consumption of the vehicle.

Also, in the low speed region, the portion (the second combustion chamber 12 and the third combustion chamber 13) of the combustion chambers is deactivated by the CDA device 20, and the exhaust gas exhausted from the activated combustion chamber (the first combustion chamber 11 and the fourth combustion chamber 14) bypasses the turbocharger 40 such that the back pressure may be reduced and the high compression ratio may be realized.

Also, by supplying the fresh air to the second exhaust manifold 35 or the second exhaust line 37 when operated as the naturally aspirated engine in the catalyst heating mode, the catalyst temperature of the exhaust gas processing device may be quickly increased through the oxidation heat generated while the remaining fuel is included in the exhaust gas. Accordingly, the emissions may be improved and the exhaust gas purification ratio by the catalyst may be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system comprising:
   an engine including a plurality of combustion chambers generating a driving torque by combustion of a fuel;
   an intake line for supplying air to the combustion chambers;
   a cylinder deactivation (CDA) device mounted at a portion of combustion chambers among the plurality of combustion chambers and selectively deactivating the portion of combustion chambers;
   a first exhaust manifold connected to a first plurality of combustion chambers mounted with the CDA device;
   a second exhaust manifold connected to a second plurality of combustion chambers without the CDA device;
   a first exhaust line flowing an exhaust gas exhausted from the first exhaust manifold;
   a second exhaust line flowing an exhaust gas exhausted from the second exhaust manifold;
   a third exhaust line connected with the first exhaust line and the second exhaust line through an exhaust gas processing device;
   a turbocharger including a turbine mounted at the first exhaust line and rotated by the exhaust gas and a compressor rotated in connection with the turbine for compressing external air;
   an electric supercharger including a motor mounted at the intake line to supply supercharged air to the combustion chambers and an electric compressor operated by the motor; and
   an air injection device supplying the air to both the second exhaust manifold and the second exhaust line in a catalyst heating mode of the exhaust gas processing device,
   wherein the exhaust gas having been discharged from the first exhaust manifold is directly discharged to the turbine and the exhaust gas having been discharged from the second exhaust manifold is directly discharged to the exhaust gas processing device.

2. The engine system of claim 1, wherein the air injection device includes:
   an air line branched from the intake line and joined to the second exhaust manifold or the second exhaust line; and
   an air control valve mounted at the air line and controlling an air amount supplied to the second exhaust manifold or the second exhaust line.

3. The engine system of claim 2, wherein
   the intake line includes a bypass line bypassing a part of the air supplied to the electric supercharger,
   wherein a bypass valve is mounted at the bypass line, and
   wherein the air line is branched from a downstream side of the bypass valve.

4. The engine system of claim 3, wherein
   in the catalyst heating mode of the exhaust gas processing device,
   the combustion chamber is deactivated and the bypass valve is blocked by the operation of the CDA device, the air flowing in the intake line is compressed by the operation of the electric supercharger, and the air control valve is configured to be partially opened to supply the air flowing in the intake line to both the second exhaust manifold and the second exhaust line.

5. The engine system of claim 4, wherein the catalyst heating mode of the exhaust gas processing device is turned ON when a catalyst temperature of the exhaust gas processing device is less than a predetermined temperature.

6. The engine system of claim 1, wherein
   the combustion chambers are included in a four-cylinder engine sequentially including four combustion chambers of a first combustion chamber, a second combustion chamber, a third combustion chamber, and a fourth combustion chamber, and the CDA device is mounted at the second combustion chamber and the third combustion chamber.

* * * * *